(12) United States Patent
Yasuno et al.

(10) Patent No.: US 10,704,605 B2
(45) Date of Patent: Jul. 7, 2020

(54) ROTATION TRANSMITTER

(71) Applicant: MITUTOYO CORPORATION, Kawasaki-shi, Kanagawa (JP)

(72) Inventors: Junsuke Yasuno, Kure (JP); Nobuyuki Hama, Kure (JP); Ryousuke Watanabe, Kure (JP)

(73) Assignee: MITUTOYO CORPORATION, Kawasaki (JP)

(*) Notice: Subject to any disclaimer, the term of this patent is extended or adjusted under 35 U.S.C. 154(b) by 305 days.

(21) Appl. No.: 15/810,823

(22) Filed: Nov. 13, 2017

(65) Prior Publication Data

US 2018/0135704 A1  May 17, 2018

(30) Foreign Application Priority Data

Nov. 16, 2016  (JP) .................................. 2016-223061

(51) Int. Cl.
*F16D 3/205*  (2006.01)

(52) U.S. Cl.
CPC ................................ *F16D 3/2057* (2013.01)

(58) Field of Classification Search
CPC ........... F16D 3/2057; F16D 3/223; F16D 3/22
USPC ....................................................... 464/103
See application file for complete search history.

(56) References Cited

U.S. PATENT DOCUMENTS 4,237,704 A * 12/1980 Varadan .............. F04C 15/0076
464/103

FOREIGN PATENT DOCUMENTS

| JP | 2512843 Y2 | 10/1996 |
| JP | 2008-208952 A | 9/2008 |
| JP | 2010-203469 A | 9/2010 |
| JP | 2014-034996 A | 2/2014 |
| JP | 2014-034997 A | 2/2014 |

* cited by examiner

*Primary Examiner* — Greg Binda
(74) *Attorney, Agent, or Firm* — Oliff PLC

(57) ABSTRACT

A rotation transmitter includes a first member, a second member, and an intermediate member. The first member is connected to the intermediate member by a first rotary mechanism. The second member is connected to the intermediate member by a second rotary mechanism. A second rotary mechanism includes: a second radial pin supported by a first one of the second member and the intermediate member; a plurality of pairs of rollers disposed at different positions of the second radial pin and each of the pairs of rollers holding the second radial pin therebetween; axial pins supporting the respective rollers while supported by a second one of the second member and the intermediate member; and stroke bearings respectively interposed between the rollers and the axial pins and supporting the rollers so that the rollers are rotatable around the axial pins and movable in a direction of the rotation axis.

2 Claims, 5 Drawing Sheets

ROTATION TRANSMITTER

The entire disclosure of Japanese Patent Application No. 2016-223061 filed Nov. 16, 2016 is expressly incorporated by reference herein.

TECHNICAL FIELD

The present invention relates to a rotation transmitter connecting two rotatable members and being configured to transmit rotations of the two members to each other while allowing for an angular misalignment, a parallel misalignment and an axial displacement of rotation axes of the connected members.

BACKGROUND ART

Typically, when two rotatable members are mutually connected to transmit mutual rotations by, for instance, extending a rotary shaft or connecting another rotary component to an end of a rotary shaft, various types of rotation transmitters are used. Such a rotation transmitter is also called a shaft coupling, joint, or coupling.

Such a rotation transmitter is required to mutually transmit rotational forces and rotation angle positions between the two connected rotary members as a basic function. Further, when the rotation transmitter is applied to a highly accurate rotation mechanism such as a roundness measuring device, the rotation transmitter is required to allow for an angular misalignment, a parallel misalignment and an axial displacement of the rotation axes of the connected members.

In the roundness measuring device, a rotation accuracy of a table on which a workpiece is placed is enhanced in order to measure roundness of an outer periphery of the workpiece at a high accuracy. In order to rotate the table, a driving shaft for transmitting a rotational force is connected to the table.

Herein, there is inevitably an angular misalignment (an angle of deviation, an inclination of each of central rotation axes), a parallel misalignment (eccentricity, misalignment in an intersecting direction of the central rotation axes) and an axial displacement (deviation of the central rotation axes in an axial direction, axial advance and retraction) between the table and the driving shaft.

When such angular misalignment, parallel misalignment and axial displacement of the rotation axes are directly transmitted from the driving shaft to the table, the rotation accuracy of the table is occasionally affected.

In order to solve the above problem, various rotation transmitters (a universal joint, flexible joint or flexible coupling) capable of reducing or absorbing the angular misalignment, parallel misalignment and axial displacement as described above have been conventionally proposed.

Patent Literature 1 (JP2010-203469A) discloses a so-called disc rotation transmitter, in which a pair of rotary shafts coaxially disposed are connected to each other with a disc member interposed therebetween and disposed in a direction orthogonal to the rotary shafts, thereby transmitting the rotation of the rotary shafts. The disc rotation transmitter allows for an angular misalignment and an axial displacement of the rotary shafts with use of deformation of the disc.

However, since an axial center of each of the rotary shafts is fixed to the disc member, it is difficult to adjust a parallel misalignment of the rotary shafts.

Patent Literature 2 (JP2008-208952A) discloses a so-called cross-joint rotation transmitter, in which a pair of a first rotary shaft and a second rotary shaft coaxially disposed are connected to each other by two pairs of connecting pins disposed in directions orthogonal to each of the first and second rotary shafts, one pair of the two pairs intersecting with the other pair of the two pairs, thereby transmitting the rotation of the rotary shafts. An angular misalignment of the rotary shafts is allowable by a rotation around at least one of the two pairs of connecting pins. A parallel misalignment of the rotary shafts is allowable by a displacement of each of the pins in its longitudinal direction.

However, since the rotary shafts cannot be displaced in an axial direction, it is difficult to adjust an axial misalignment of the rotary shafts.

Patent Literature 3 (JP Registered Utility Model No. 2512843) discloses a so-called Oldham rotation transmitter, in which two sets of slide structures, each set of which includes a convex portion and a concave groove extending in directions intersecting with rotary shafts, are combined in a manner to intersect with each other, thereby transmitting the rotation of the rotary shafts. The Oldham rotation transmitter allows for a parallel misalignment of the rotary shafts by a displacement of the slide structures in their longitudinal directions, allows for an angular misalignment of the rotary shafts by an angular displacement of the convex portions and the concave grooves of the slide structures, and further allows for an axial misalignment by an axial displacement of the convex portions and the concave grooves of the slide structures.

However, since the longitudinally slidable convex portions are respectively fitted in the longitudinally slidable concave portions in the Oldham rotation transmitter, a fitting clearance for assembly of the corresponding convex portion and concave groove, which also serves as a predetermined clearance for sliding, is required. Since the Oldham rotation transmitter has such a clearance, backlash occurs in the rotation transmission, inevitably resulting in adversely affecting the accuracy of the rotation angle positions.

In order to solve the problem of the Oldham rotation transmitter, the inventors of the present application propose a novel rotation transmitter (Patent Literature 4 (JP2014-34996A)).

The rotation transmitter of Patent Literature 4 has basic mutually-intersecting-slide structures of a typical Oldham rotation transmitter and further includes a mechanism of adjusting positions of sliders of the respective slide structures with respect to guide surfaces, thereby eliminating backlash during the operation of the rotation transmitter.

The inventors of the present application propose a novel rotation transmitter that is a combination of a disc rotation transmitter and a cross-joint rotation transmitter to solve various disadvantages (Patent Literature 5 (JP2014-34997A)).

The rotation transmitter of Patent Literature 5 has a cross-joint structure combined with a disc and is configured to adjust an axial misalignment, which is difficult to adjust in a cross-joint rotation transmitter, with use of elasticity of the disc.

With the above rotation transmitter of Patent Literature 4 or 5, all of the angular misalignment, the parallel misalignment, and the axial misalignment, which are difficult to adjust in a typical rotation transmitter, have been allowable.

However, even with the rotation transmitter of Patent Literature 4 or 5, the following disadvantages have occurred when a higher accuracy is required.

Specifically, in the rotation transmitter of Patent Literature 4, the parallel misalignment is smoothly adjusted using the mutually intersecting slide structures. However, the adjustment of the angular misalignment of the rotary shafts further requires a sliding guide using guide surfaces and the sliders while the adjustment of the axial misalignment only requires the sliding guide using the guide surfaces and the sliders. When such a sliding guide is used, the sliding guide transmits a friction force, which may adversely affect a highly accurate rotation transmission.

Moreover, in the rotation transmitter of Patent Literature 5, the angular misalignment and the parallel misalignment of the rotary shafts are smoothly adjusted using the cross-joint structures intersecting with each other. However, since the axial misalignment is adjusted solely using the elastic deformation of the disc, an elastic force is transmitted, which may adversely affect a highly accurate rotation transmission.

SUMMARY OF THE INVENTION

An object of the invention is to provide a rotation transmitter capable of sufficiently allowing for an angular misalignment, a parallel misalignment and an axial misalignment of rotary shafts and avoiding transmission of an elastic force and a friction force.

According to an aspect of the invention, a rotation transmitter connecting a pair of rotary members rotatable around a common rotation axis includes: a first member connected to one of the pair of rotary members; a second member connected to the other of the pair of rotary members; and an intermediate member connecting the first member to the second member, in which the first member is connected to the intermediate member via a first rotary mechanism capable of rotating around a first rotation axis intersecting with the common rotation axis and capable of moving in a direction of the first rotation axis, the second member is connected to the intermediate member via a second rotary mechanism capable of rotating around a second rotation axis intersecting with the common rotation axis and the first rotation axis and capable of moving in a direction of the second rotation axis, and the second rotary mechanism includes: a second radial pin supported by one of the second member and the intermediate member and extending in the direction of the second rotation axis; a plurality of pairs of rollers disposed at different positions of the second radial pin and each of the pairs of rollers holding the second radial pin therebetween at both lateral sides of the second radial pin; axial pins extending in the direction of the common rotation axis while supporting the respective rollers and being supported by the other of the second member and the intermediate member; and second stroke bearings interposed between the rollers and the axial pins and supporting the rollers so that the rollers are rotatable around the axial pins and movable in a direction of the common rotation axis.

According to the above aspect of the invention, the first rotary mechanism and the second rotary mechanism provide basic functions of a cross-joint rotation transmitter. Specifically, for transmitting the rotation, angular misalignment of the rotary members is allowable since the rotary members are rotatable around the first rotation axis and the second rotation axis. Moreover, a parallel misalignment of the rotary members is allowable since the rotary members are movable along the first rotation axis and the second rotation axis.

Further, in the second rotary mechanism in this arrangement, the rotation and the axial movement relative to the second rotation axis are allowable by using the second radial pin and the rollers while the movement in an axial direction is allowable by using the stroke bearings respectively interposed between the rollers and the axial pins.

In other words, the second rotary mechanism in this arrangement allows for the axial misalignment of the rotary members. In this arrangement, the stroke bearings causes no elastic force and no or extremely slight friction force between the axial pins and the rollers.

Accordingly, the rotation transmitter in this arrangement can provide a sufficient allowance for the angular misalignment, parallel misalignment and axial misalignment relative to the rotation axis and can avoid transmission of the elastic force and the friction force.

The stroke bearing used in this arrangement is a component also called a stroke bush, slide rotary bush, linear bearing or linear bush.

The stroke bearing is specifically structured to include a cylindrical sleeve (or a bush), a pin (or a shaft) coaxially inserted in the sleeve, and a great number of balls interposed between an inner circumferential surface of the sleeve and an outer circumferential surface of the pin. The balls can roll over the inner circumferential surface of the sleeve and the outer circumferential surface of the pin with an extremely slight clearance therebetween, so that the sleeve and the pin are rotatable and movable in the rotation axis direction.

The great number of balls are usually held by a retainer. Moreover, a lip seal and the like are used for a waterproof and dustproof portion in which the balls and the retainer are housed.

Instead of the rolling by the great number of balls, a component having a slide surface made of a material (e.g., a polyacetal resin) having a low frictional property is usable.

In the above arrangement, it is preferable that the first rotary mechanism includes: a first radial pin supported by one of the first member and the intermediate member and extending in a direction of the first rotation axis; a bracket inserted with the first radial pin and supported by the other of the first member and the intermediate member; and a first stroke bearing interposed between the first radial pin and the bracket and supporting the first radial pin so that the first radial pin is rotatable relative to the bracket and movable in a direction of the first rotation axis.

In this arrangement, the first member is connected to the intermediate member via the first radial pin, the stroke bearing and the bracket. In this arrangement, the first radial pin is connected to the bracket via the stroke bearing, so that the first rotary mechanism can smoothly rotate around the first rotation axis and move along the first rotation axis.

Accordingly, the rotation transmitter in this arrangement can provide a sufficient allowance for the angular misalignment, parallel misalignment and axial misalignment relative to the rotation axis and can avoid transmission of the elastic force and the friction force.

BRIEF DESCRIPTION OF DRAWING(S)

DESCRIPTION OF EMBODIMENT(S)

Embodiments of the invention will be described below with reference to the attached drawings.

First Exemplary Embodiment

Figure 1:
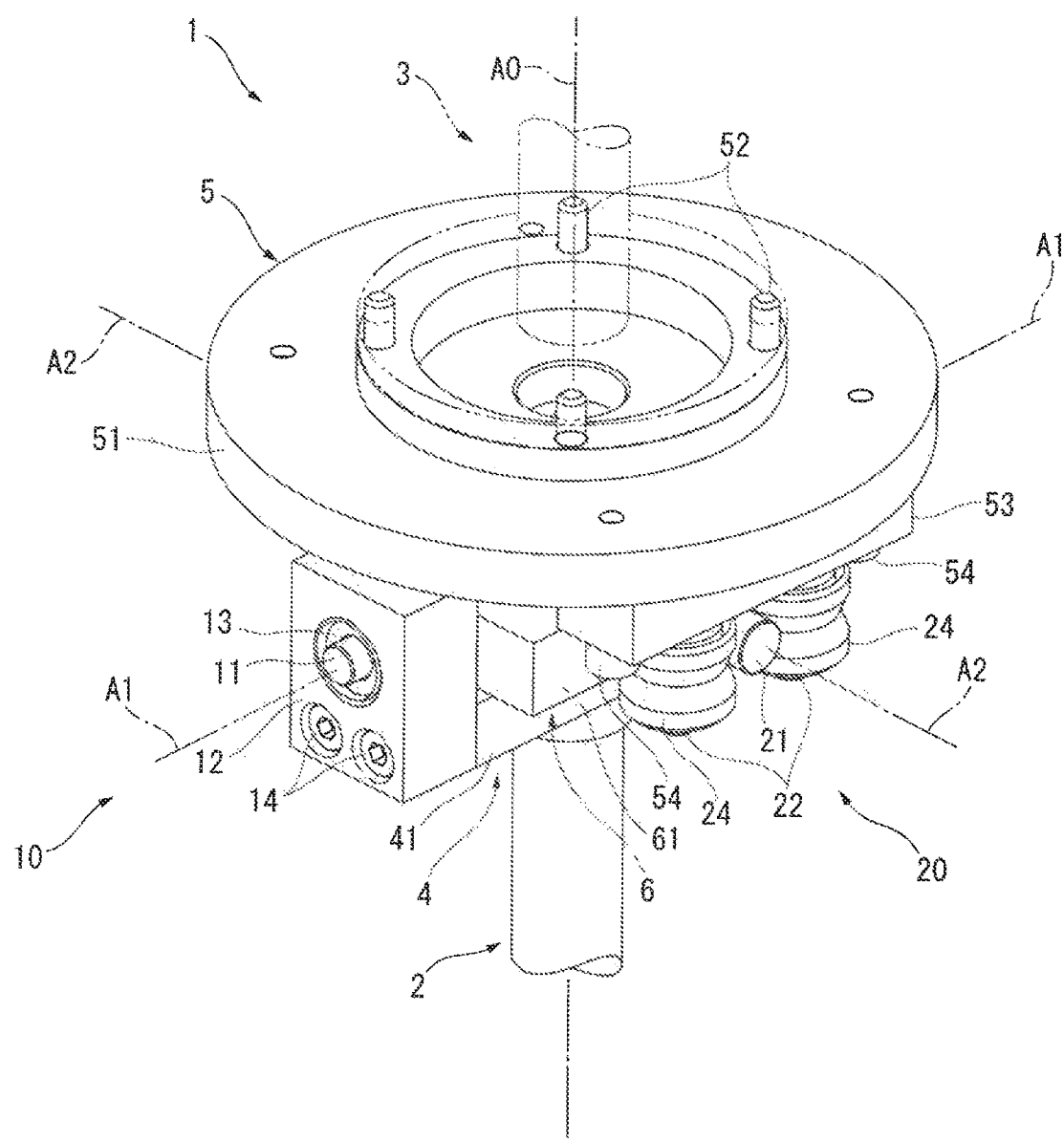
FIG. 1 is a perspective view showing a first exemplary embodiment of the invention viewed from a side of a second member.
Figure 2:
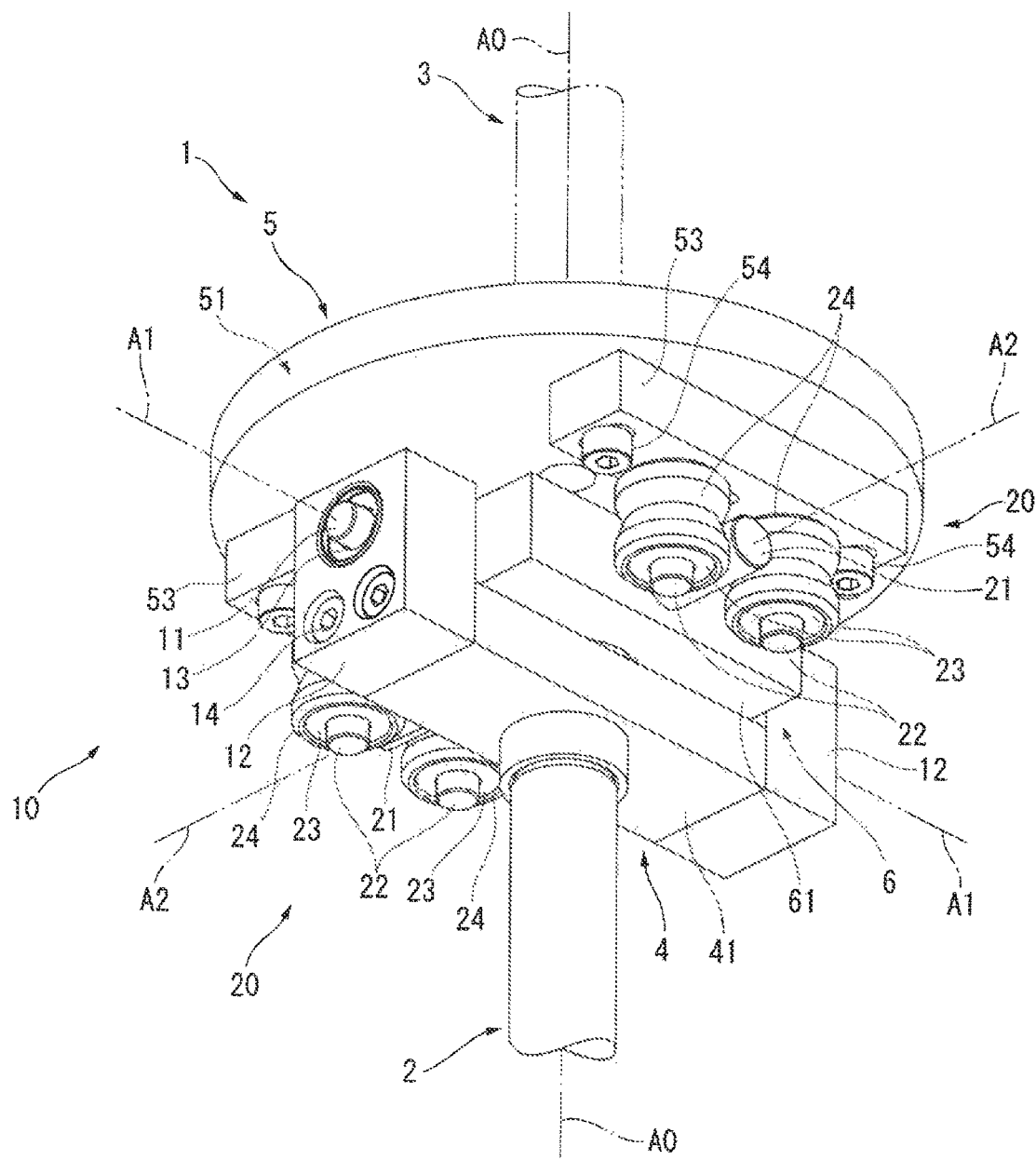
FIG. 2 is a perspective view showing the first exemplary embodiment of the invention viewed from a side of a first member.
Figure 3:
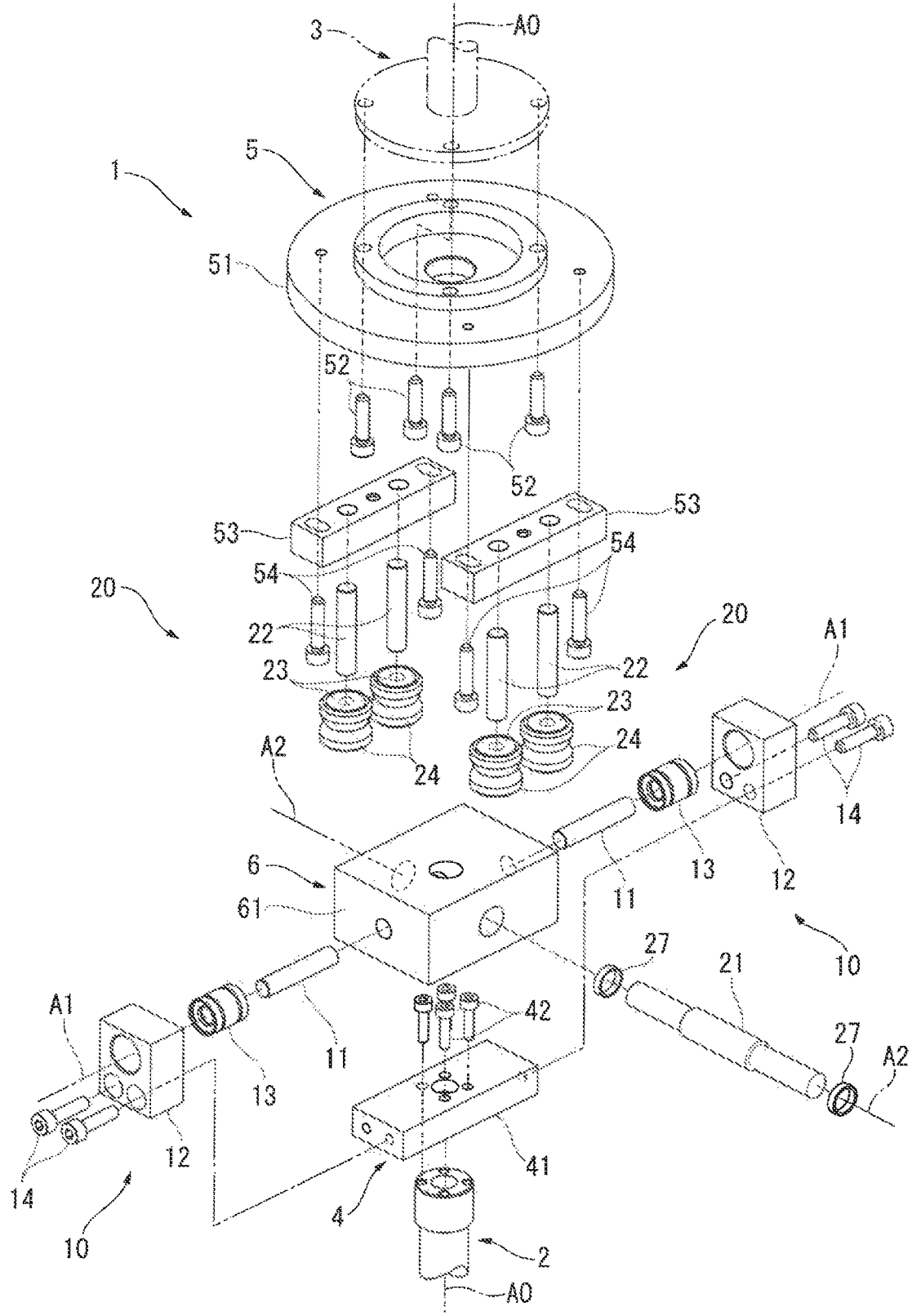
FIG. 3 is an exploded perspective view showing the first exemplary embodiment.

FIGS. 1 to 3 show a first exemplary embodiment of the invention.

As shown in FIGS. 1 and 2, a rotation transmitter 1 according to the first exemplary embodiment connects a pair of rotary members 2 and 3 configured to rotate around a common rotation axis A0.

In the first exemplary embodiment, for instance, the rotation transmitter 1 is used in a connection portion between a table on which a workpiece is placed and a driving shaft in a roundness measuring device. A cylindrical shaft (near the driving shaft) is defined as the rotary member 2 and a disc-shaped member (near the table) is defined as the rotary member 3.

As shown in FIG. 3, the rotation transmitter 1 includes a first member 4, a second member 5 and an intermediate member 6 that are arranged coaxially with the rotation axis A0 of the rotary members 2 and 3.

The first member 4 includes a block-shaped body 41 fastened to an end of the rotary member 2 by a bolt 42.

The second member 5 includes a disc-shaped body 51 fastened to the rotary member 3 by a bolt 52.

The intermediate member 6 includes a block-shaped body 61. A first rotary mechanism 10 is formed between the intermediate member 6 and the first member 4. A second rotary mechanism 20 is formed between the intermediate member 6 and the second member 5.

The first rotary mechanism 10 connects the first member 4 to the intermediate member 6.

In the first rotary mechanism 10, rotation can be made around a first rotation axis A1 extending in a direction intersecting with the rotation axis A0 and movement can be made in the direction of the first rotation axis A1.

The first rotary mechanism 10 has an arrangement as follows.

A pair of first radial pins 11 extending in the direction of the first rotation axis A1 are fixed by press fitting and the like to opposite sides of the body 61 of the intermediate member 6.

A pair of brackets 12 are fixed by bolts 14 to opposite sides of the body 41 of the first member 4.

Stroke bearings 13 are fitted in the corresponding brackets 12. The first radial pins 11 are inserted in the corresponding stroke bearings 13. The brackets 12 and the first radial pins 11 can move in the first rotation axis A1 and rotate around the first rotation axis A1.

The first radial pins 11, the brackets 12, and the stroke bearings 13 define the first rotary mechanism 10.

The second rotary mechanism 20 connects the second member 5 to the intermediate member 6.

In the second rotary mechanism 20, rotation can be made around a second rotation axis A2 extending in a direction intersecting with the rotation axis A0 and the first rotation axis A1, and movement can be made in the direction of the second rotation axis A2.

The second rotary mechanism 20 has an arrangement as follows.

A second radial pin 21 extending in a direction of the second rotation axis A2 is set in the body 61 of the intermediate member 6 in a manner to penetrate the body 61 from one side to the opposite side. The second radial pin 21 is rotatably supported by the body 61 via a pair of bearings 27 while small-diameter ends of the second radial pin 21 are kept exposed from both the sides of the body 61 (i.e., in a state where the small-diameter ends of the second radial pin 21 project from the body 61 in the direction of the second rotation axis A2).

The bearings 27 may be omitted and the second radial pin 21 may be fixed to the body 61 by pressure fitting and the like.

A pair of supports 53 extending along the first rotation axis A1 are fixed by bolts 54 to a lower surface (a surface facing the intermediate member 6) of the body 51 of the second member 5. A pair of axial pins 22 extending in a direction of the rotation axis A0 are fixed by pressure fitting and the like to each of the supports 53 (i.e., four axial pins 22 in total are fixed). The pair of axial pins 22 fixed to each of the supports 53 are disposed so as to hold the second radial pin 21 between the axial pins 22 at both lateral sides of the second radial pin 21 (see FIGS. 1 and 2).

The axial pins 22 are respectively installed in rollers 24. Stroke bearings 23 are respectively fitted in the rollers 24. The stroke bearings 23 enable the rollers 24 to move relative to the axial pins 22 in the direction of the rotation axis A0 and rotate around the rotation axis A0.

The rollers 24 in pairs hold the second radial pin 21 therebetween at both the lateral sides of the second radial pin 21 and can roll on the second radial pin 21. In order to transmit a rotational force around the rotation axis A0, a first pair of the rollers 24 and a second pair of the rollers 24 hold the second radial pin 21 at different positions separated from each other as far as possible.

The second radial pin 21, the axial pins 22, the stroke bearings 23, and the rollers 24 define the second rotary mechanism 20.

In the second rotary mechanism 20, the rollers 24 rolls on the second radial pin 21, so that the second member 5 and the intermediate member 6 are movable in the direction of the second rotation axis A2.

Moreover, since the second radial pin 21, on which the rollers 24 are to roll, is rotatable relative to the body 61 by the bearings 27, the second member 5 and the intermediate member 6 are rotatable around the second rotation axis A2.

Further, since the rollers 24 move along the axial pins 22, the second member 5 and intermediate member 6 are movable in the direction of the rotation axis A0.

In the first exemplary embodiment with the above arrangement, the first rotary mechanism 10 and the second rotary mechanism 20 provide basic functions of a cross-joint rotation transmitter.

Specifically, when transmitting rotation, an angular misalignment of the rotary members 2 and 3 in the direction of the rotation axis A0 is allowable since the rotary members 2 and 3 are rotatable around the first rotation axis A1 and the second rotation axis A2. Moreover, a parallel misalignment of the rotation axes A0 of the rotary members 2 and 3 is allowable since the rotary members 2 and 3 are movable along the first rotation axis A1 and the second rotation axis A2.

Further, the second rotary mechanism 20 of the first exemplary embodiment allows for the rotation and the axial movement relative to the second rotation axis A2 using the second radial pin 21 and the rollers 24 while allowing for the movement in the direction of the rotation axis A0 using the stroke bearings 23 interposed between the rollers 24 and the corresponding axial pins 22.

In other words, the second rotary mechanism 20 in the first exemplary embodiment allows for the axial misalignment of the rotary members 2 and 3 in the direction of the rotation axis A0. The stroke bearings 23 in this arrangement cause no elastic three and no or extremely slight friction force between the axial pins 22 and the rollers 24 during the relative movement thereof.

As described above, the rotation transmitter 1 in the exemplary embodiment can provide a sufficient allowance for the angular misalignment, parallel misalignment and axial misalignment relative to the rotation axis A0 and can avoid transmission of the elastic force and the friction force.

Second Exemplary Embodiment

Figure 4:
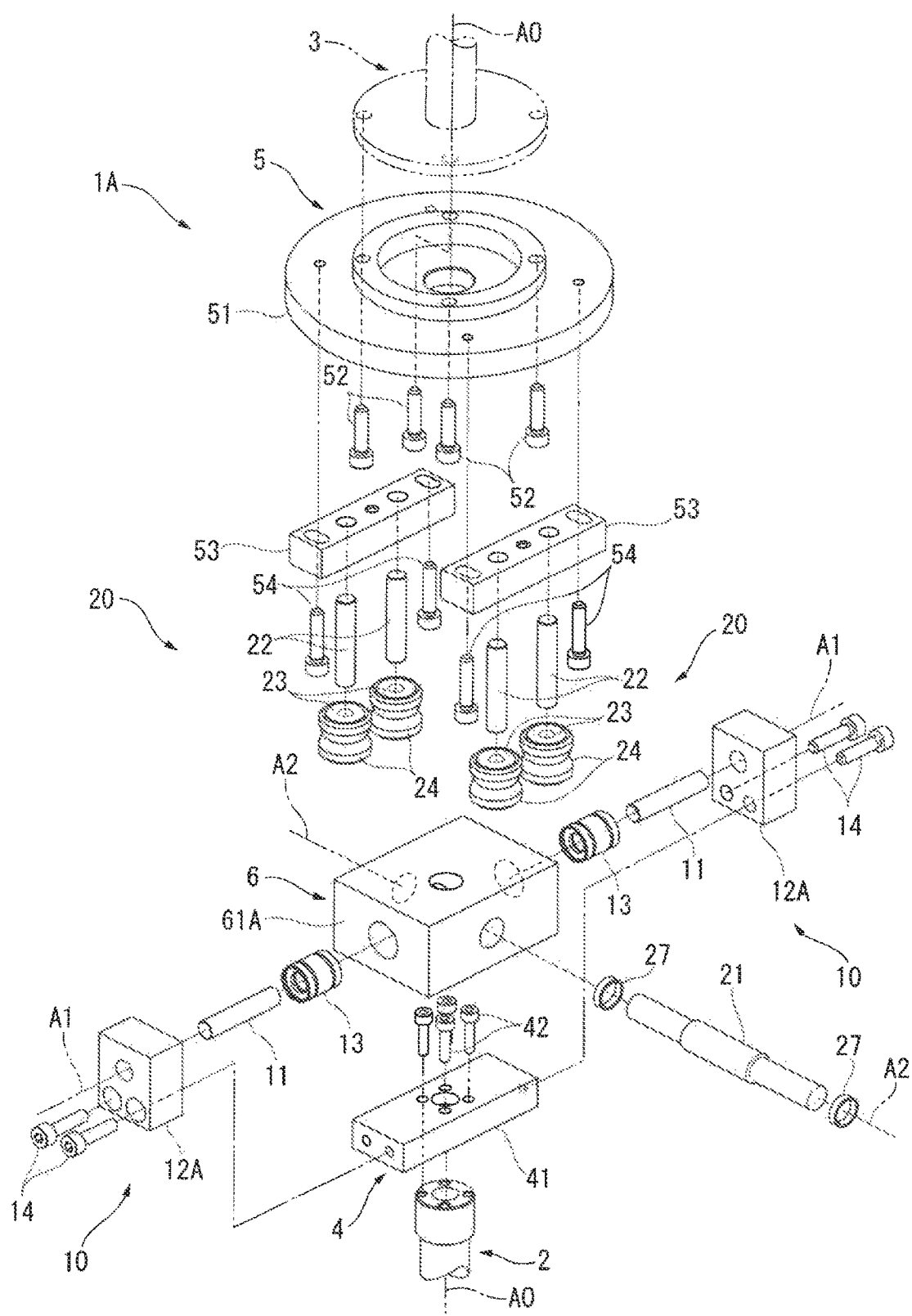
FIG. 4 is an exploded perspective view showing a second exemplary embodiment of the invention.

FIG. 4 shows a second exemplary embodiment of the invention.

The second exemplary embodiment is a partial modification of the first exemplary embodiment, in which the basic structure is the same as that in the first exemplary embodiment. Accordingly, the overlapping description of the common structure is omitted and only a difference will be described below.

In the above rotation transmitter 1 of the first exemplary embodiment (see FIG. 3), the first radial pins 11 are fixed to the body 61 of the intermediate member 6 and the stroke bearings 13 are fitted in the corresponding brackets 12.

In contrast, in a rotation transmitter 1A of the second exemplary embodiment (see FIG. 4), the stroke bearings 13 are fitted in a body 61A of the intermediate member 6 and the first radial pins 11 are respectively fixed to brackets 12A. The body 61A has a thickness large enough for the stroke bearings 13 to be fitted therein.

In the second exemplary embodiment, the first radial pins 11, the brackets 12, and the stroke bearings 13 define the first rotary mechanism 10 in the same manner as in the first exemplary embodiment. The first rotary mechanism 10 connects the first member 4 to the intermediate member 6 so that the first member 4 and the intermediate member 6 can move in the direction of the first rotation axis A1 and rotate around the first rotation axis A1.

Accordingly, also in the second exemplary embodiment, the same advantageous effects as those according to the first exemplary embodiment can be obtained.

It should be noted that, in another exemplary embodiment, the first radial pins 11 may be fixed to the body 41 of the first member 4, the brackets 12 may be fixed to the body 61 of the intermediate member 6, and the stroke bearings 13 may be fitted in the brackets 12, thereby providing the first rotary mechanism 10.

Alternatively, the stroke bearings 13 may be fitted in the body 41 of the first member 4, the brackets 12 may be fixed to the body 61 of the intermediate member 6, and the first radial pins 11 may be fixed to the brackets 12, thereby providing the first rotary mechanism 10.

Also in the another exemplary embodiment with the above arrangement, the same advantageous effects as those according to the first exemplary embodiment can be obtained.

Third Exemplary Embodiment

Figure 5:
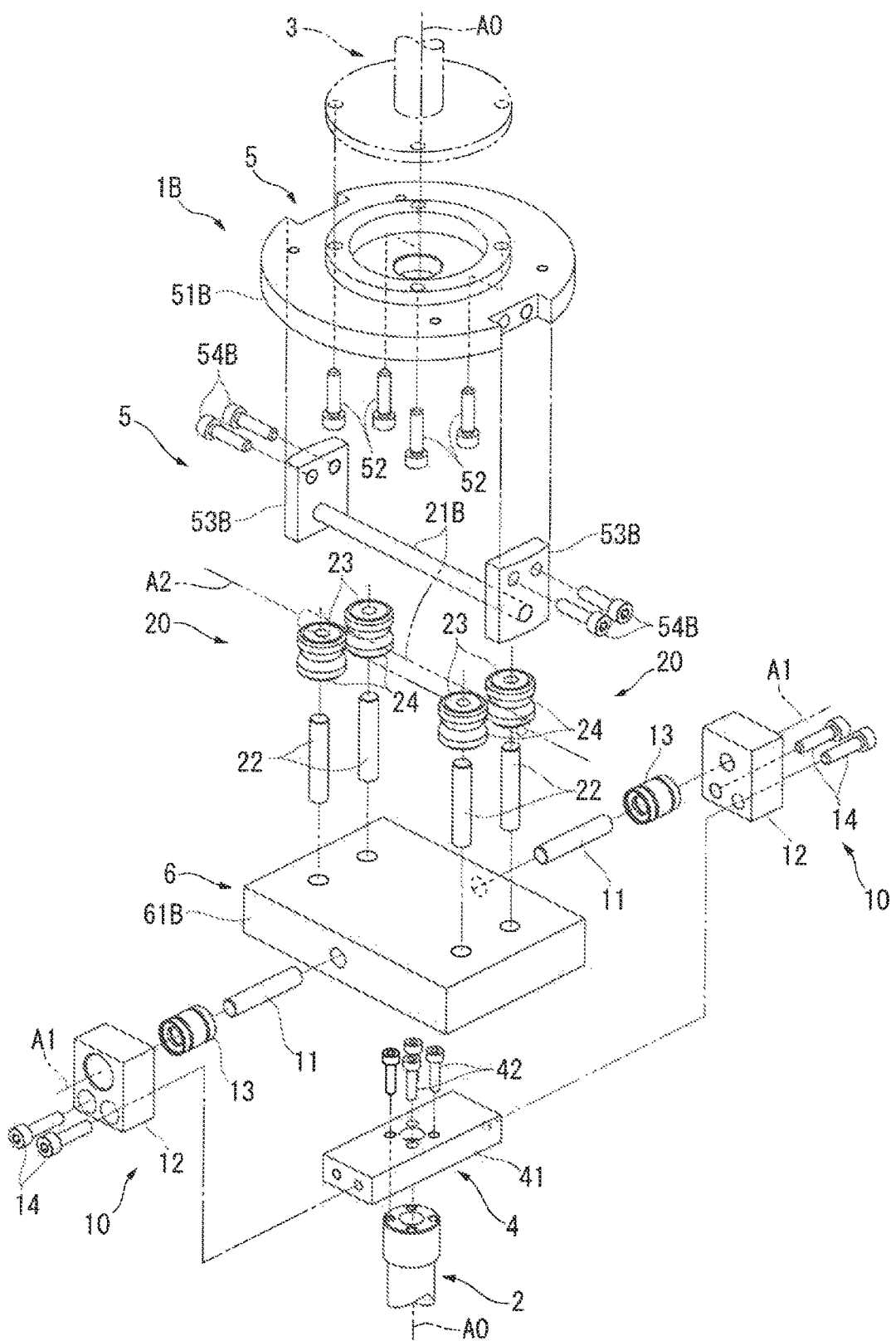
FIG. 5 is an exploded perspective view showing a third exemplary embodiment of the invention.

FIG. 5 shows a third exemplary embodiment of the invention.

The third exemplary embodiment is a partial modification of the first exemplary embodiment, in Which the basic structure is the same as that in the first exemplary embodiment. Accordingly, the overlapping description of the common structure is omitted and only a difference will be described below.

In the above rotation transmitter 1 of the first exemplary embodiment (see FIG. 3), the second radial pin 21 is fixed to the body 61 of the intermediate member 6 while the axial pins 22, the stroke bearings 23 and the rollers 24 are disposed to the body 51 of the second member 5.

In contrast, in a rotation transmitter 1B of the third exemplary embodiment (see FIG. 5), the axial pins 22, the stroke bearings 23 and the rollers 24 are disposed to a body 61B of the intermediate member 6 while a second radial pin 21B is disposed to a body 51B of the second member 5.

The body 61B of the intermediate member 6 has a planar shape enlarged enough to position a set of a first pair of the axial pins 22 and a first pair of the rollers 24 remotely from a set of a second pair of the axial pins 22 and a second pair of the rollers 24.

A pair of supports 53B are fixed by bolts 54B to the body 51B of the second member 5 at opposite positions in the direction of the second rotation axis A2 on an outer circumference of the body 51B. The supports 53B support the second radial pin 21B intersecting with the rotation axis A0 and extending in the direction of the second rotation axis A2. The second radial pin 21B is a replacement for the aforementioned pair of second radial pins 21 in the first exemplary embodiment.

In the third exemplary embodiment, the rollers 24 in pairs hold the second radial pin 21B therebetween at both lateral sides of the second radial pin 21B and can roll on the second radial pin 21B.

In order to transmit a rotational force around the rotation axis A0, a first pair of the rollers 24 and a second pair of the rollers 24 hold the second radial pin 21B at different positions separated from each other as far as possible.

The second radial pin 21B, the axial pins 22, the stroke bearings 23, and the rollers 24 define the second rotary mechanism 20.

Also in the third exemplary embodiment as described above, the same advantageous effects as those according to the first exemplary embodiment can be obtained.

Other Exemplary Embodiment(s)

The invention is not limited to the above-described exemplary embodiments, but may include any modification or improvement as long as an object of the invention can be achieved.

As described in the first and second exemplary embodiments, a layout of the first radial pins 11, the brackets 12 and the stroke bearings 13 in the first rotary mechanism 10 may be changed as desired.

Moreover, the pair of first radial pins 11, which are used in the first rotary mechanism 10, may be replaced by a single member similar to the second radial pin 21B of the second rotary mechanism 20 in the third exemplary embodiment.

Further, since the first rotary mechanism 10 is only required to enable the first member 4 and the intermediate member 6 to rotate around the first rotation axis A1 and move along the first rotation axis A1 to transmit the rotational force generated around the rotation axis A0, other combined components may serve as the first rotary mechanism 10 as long as the same function is achievable.

As described in the first and third exemplary embodiments, a layout of the second radial pin 21, 21B, the axial pins 22, the stroke bearings 23 and the rollers 24 in the second rotary mechanism 20 may be changed as desired.

At this time, it is only required that the second rotary mechanism 20 enables the second member 5 and the intermediate member 6 to rotate around the second rotation axis A2 and move along the second rotation axis A2 using the second radial pin 21, 21B and the rollers 24, and enables to transmit the rotational force around the rotation axis A0. Further, it is only required that the rollers 24 are movable relative to the axial pins 22 along the rotation axis A0 by supporting the rollers 24 on the axial pins 22 via the stroke bearings 23 respectively interposed therebetween.

In the above exemplary embodiments, a pair of rotary members 2 and 3 connected by the rotation transmitter 1 may be a pair of typical cylindrical shafts or a pair of disc-shaped members. When such a pair of typical cylindrical shafts or a pair of disc-shaped members are used as the pair of rotary members 2 and 3 required to rotate around the common rotation axis A0 with a high accuracy, excellent advantages of the invention are obtainable.

The rotary members 2 and 3 can be respectively in a form of a driving shaft and a table on which a workpiece is placed in a roundness measuring device as described in the above exemplary embodiments. Moreover, the rotary members 2 and 3 may be in a form of a rotation transmitting portion of another measuring device or as a rotation transmitting portion of an instrument other than the measuring device. As long as the rotation transmitter 1 of the invention is used as a connector between a pair of rotary members which transmits a predetermined torque and is required to have a high angular position accuracy, use of the rotation transmitter 1 of the invention can provide excellent advantages.

What is claimed is:

1. A rotation transmitter connecting a pair of rotary members rotatable around a common rotation axis, the rotation transmitter allowing a misalignment of the rotary members with respect to the common rotation axis, the rotation transmitter comprising:
    a first member connected to one of the pair of rotary members;
    a second member connected to the other of the pair of rotary members; and
    an intermediate member connecting the first member to the second member, wherein
    the first member is connected to the intermediate member via a first mechanism capable of (i) rotation around a first axis intersecting with the common rotation axis and (ii) movement in a direction parallel to the first axis,
    the second member is connected to the intermediate member via a second mechanism capable of (i) rotation around a second axis intersecting with the common rotation axis and the first axis and (ii) movement in a direction parallel to the second axis, and
    the second mechanism comprises:
        a second radial pin supported by one of the second member and the intermediate member and extending along the second axis;
        a plurality of pairs of rollers disposed at different positions of the second radial pin and each of the pairs of rollers holding the second radial pin therebetween at both lateral sides of the second radial pin;
        axial pins extending in a direction parallel to the common rotation axis while supporting the respective rollers and being supported by the other of the second member and the intermediate member; and
        second stroke bearings interposed between the rollers and the axial pins and supporting the rollers so that the rollers are rotatable around the axial pins and movable in the direction parallel to the common rotation axis.

2. The rotation transmitter according to claim 1, wherein the first rotary mechanism comprises:
    a first radial pin supported by one of the first member and the intermediate member and extending along the first axis;
    a bracket into which the first radial pin is inserted, the bracket being supported by the other of the first member and the intermediate member; and
    a first stroke bearing interposed between the first radial pin and the bracket and supporting the first radial pin so that the first radial pin is rotatable relative to the bracket and movable in the direction parallel to the first axis.

* * * * *